United States Patent
Santos et al.

(10) Patent No.: US 11,898,086 B2
(45) Date of Patent: Feb. 13, 2024

(54) CATIONIC AND ANIONIC SHALE INHIBITORS AND CLAY STABILIZERS

(71) Applicant: Halliburton Energy Services, Inc., Houston, TX (US)

(72) Inventors: Catherine Martin Santos, Houston, TX (US); Chunli Li, The Woodlands, TX (US); James William Ogle, Pittsburgh, PA (US); Liang Xu, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 98 days.

(21) Appl. No.: 16/882,043

(22) Filed: May 22, 2020

(65) Prior Publication Data
US 2021/0071059 A1  Mar. 11, 2021

Related U.S. Application Data

(60) Provisional application No. 62/897,700, filed on Sep. 9, 2019.

(51) Int. Cl.
*C09K 8/24* (2006.01)
*C09K 8/68* (2006.01)
(Continued)

(52) U.S. Cl.
CPC .............. *C09K 8/24* (2013.01); *C09K 8/68* (2013.01); *E21B 21/00* (2013.01); *E21B 43/26* (2013.01); *C09K 2208/12* (2013.01)

(58) Field of Classification Search
CPC ........ C09K 8/24; C09K 8/68; C09K 2208/12; E21B 21/00; E21B 43/26
See application file for complete search history.

(56) References Cited

U.S. PATENT DOCUMENTS

| 5,099,923 A | 3/1992 | Aften et al. |
| 5,152,906 A | 10/1992 | Aften et al. |

(Continued)

FOREIGN PATENT DOCUMENTS

| WO | 2016/003460 A1 | 1/2016 |
| WO | 2016/096502 A1 | 6/2016 |

(Continued)

OTHER PUBLICATIONS

Barati, Pezhman, et al. "Shale hydration inhibition characteristics and mechanism of a new amine-based additive in water-based drilling fluids." Petroleum 3.4 (2017): 476-482.
(Continued)

*Primary Examiner* — Crystal J. Lee
(74) *Attorney, Agent, or Firm* — Thomas Rooney; C. Tumey Law Group PLLC

(57) ABSTRACT

Compositions and methods of using of such compositions to, for example, inhibit shale are provided. In one embodiment, the methods include introducing an additive including a cationic clay stabilizer and an anionic clay stabilizer into a treatment fluid; and introducing the treatment fluid into a wellbore penetrating at least a portion of a subterranean formation. In some embodiments, the methods include introducing an additive including a cationic shale inhibitor and an anionic shale inhibitor into a treatment fluid; and introducing the treatment fluid into a wellbore penetrating at least a portion of a subterranean formation.

9 Claims, 10 Drawing Sheets

(51) Int. Cl.
*E21B 21/00* (2006.01)
*E21B 43/26* (2006.01)

(56) References Cited

U.S. PATENT DOCUMENTS

| | | |
|---|---|---|
| 6,355,600 B1 | 3/2002 | Norfleet et al. |
| 7,439,210 B2 | 10/2008 | West et al. |
| 7,825,072 B2 | 11/2010 | Carbajal et al. |
| 10,106,721 B2 * | 10/2018 | Yue ................ C09K 8/035 |
| 11,198,811 B2 * | 12/2021 | Xu .................. C09K 8/68 |
| 2017/0218250 A1 * | 8/2017 | Boul ................ C09K 8/40 |
| 2017/0327723 A1 * | 11/2017 | Friedheim ........ C09K 8/24 |
| 2017/0327732 A1 | 11/2017 | He et al. |

FOREIGN PATENT DOCUMENTS

| | | | |
|---|---|---|---|
| WO | 2016/131762 A1 | 8/2016 | |
| WO | WO-2016131762 A1 * | 8/2016 | ........ C09K 8/608 |
| WO | 2019/177594 A1 | 9/2019 | |

OTHER PUBLICATIONS

International Search Report and Written Opinion issued in PCT Application No. PCT/US2020/034613 dated Sep. 16, 2020, 13 pages.

* cited by examiner

CATIONIC AND ANIONIC SHALE INHIBITORS AND CLAY STABILIZERS

CROSS-REFERENCE TO RELATED APPLICATION

The present application claims the benefit of U.S. Provisional Application No. 62/897,700, filed Sep. 9, 2019, which is incorporated herein by reference in its entirety for all purposes.

BACKGROUND

The present disclosure relates to compositions and methods for drilling and/or treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a wellbore in a subterranean formation or to complete a wellbore in a subterranean formation, as well as numerous other purposes. A drilling fluid, or "mud," which a drilling fluid is also often called, is a treatment fluid that is circulated in a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

During drilling, fracturing, or other treatment of subterranean formations, various strata that include reactive shales may be encountered. As used herein, the term "shale" is defined to mean materials that may "swell," or increase in volume, when exposed to water. Examples of these shales may include certain types of clays (for example, bentonite). Reactive shales may be problematic during treatment operations because of their tendency to degrade when exposed to aqueous media such as aqueous-based treatment fluids. This degradation, of which swelling is one example, can result in undesirable conditions and undesirable interference with the treatment fluids.

One technique used to counteract the propensity of aqueous treatment fluids to interact with reactive shales or clays in a formation involves the use of certain additives in aqueous drilling fluids that may inhibit shale or clay, e.g., additives that may demonstrate a propensity for reducing the tendency of shale or clay to absorb water. However, certain shale inhibitors exhibit compatibility issues caused with anionic friction reducers, and may be less effective in higher temperature environments.

BRIEF DESCRIPTION OF THE DRAWINGS

These drawings illustrate certain aspects of some of the embodiments of the present disclosure and should not be used to limit or define the claims.

Figure 1:
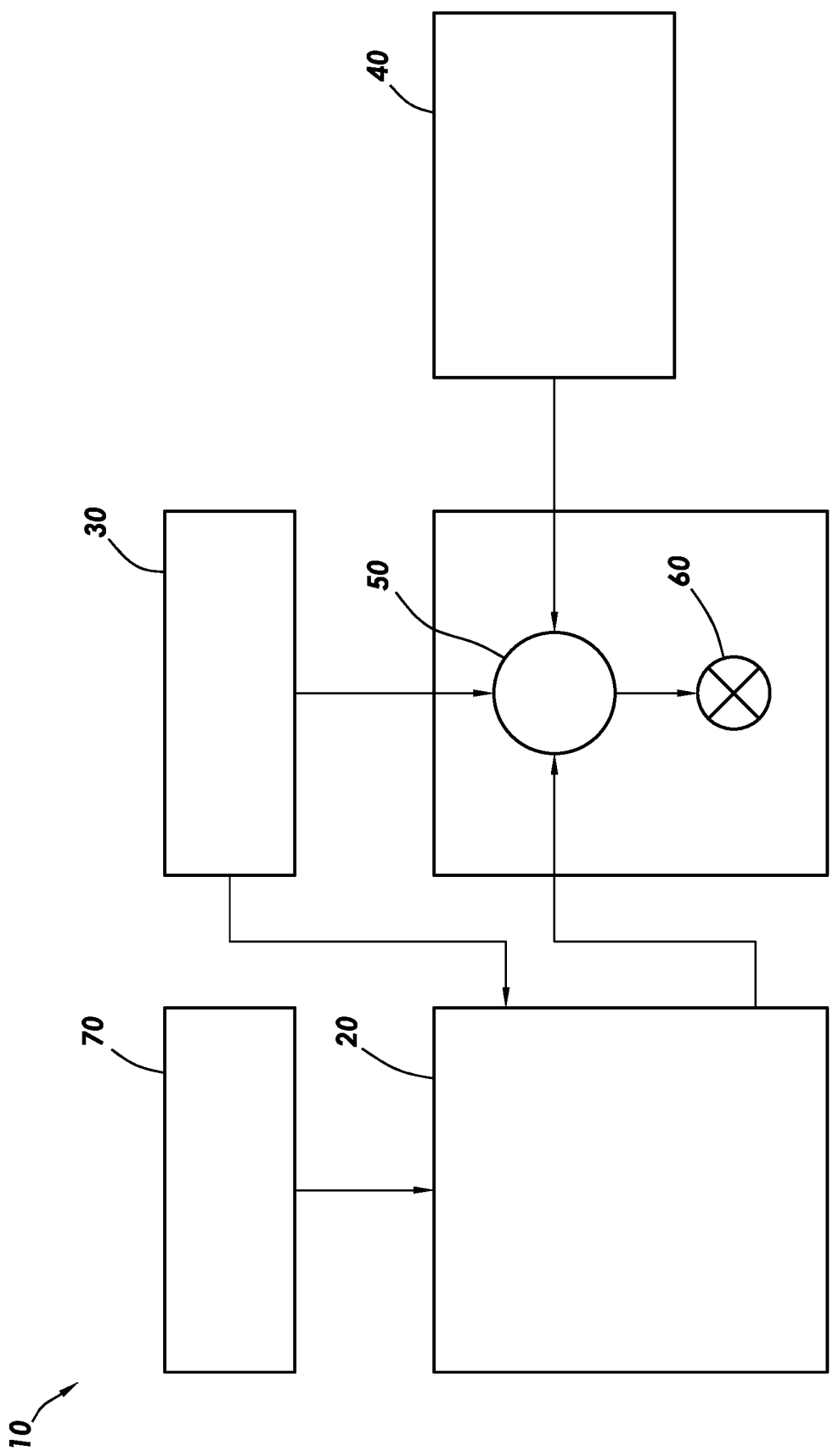
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions and methods for use in subterranean formations. More specifically, the present disclosure includes introducing a shale inhibitor additive into a treatment fluid and introducing the treatment fluid into a wellbore penetrating at least a portion of a subterranean formation.

The methods and compositions of the present disclosure include introducing an additive including a cationic shale inhibitor and an anionic shale inhibitor into a treatment fluid; and introducing the treatment fluid into a wellbore penetrating at least a portion of a subterranean formation. In some embodiments, the cationic shale inhibitor may be present in the additive in certain ratios to one another, for example, in a ratio of about 1:2 to about 1:10 by volume of the anionic shale inhibitor. In some embodiments, the methods of the present disclosure include drilling at least a portion of a wellbore to penetrate at least a portion of a subterranean formation that includes shale; circulating a drilling fluid in at least the portion of the wellbore while drilling at least the portion of the wellbore, the drilling fluid including a base fluid, a cationic shale inhibitor, and an anionic shale inhibitor; and allowing the shale inhibitor to interact with the shale in the subterranean formation to at least partially inhibit the shale.

In certain embodiments, the methods of the present disclosure include introducing a treatment fluid into a wellbore penetrating at least a portion of a subterranean formation that includes clay at or above a pressure sufficient to create or enhance one or more fractures in the subterranean formation, wherein the treatment fluid includes: a base fluid, and a clay stabilizer additive including a cationic clay stabilizer and an anionic clay stabilizer; and allowing the clay stabilizer additive to interact with the clay in the subterranean formation to at least partially inhibit the clay.

Among the many potential advantages to the methods and compositions of the present disclosure, only some of which are alluded to herein, the methods and compositions of the present disclosure may exhibit a synergistic effect between anionic shale inhibitor and cationic shale inhibitors. For example, in certain embodiments, shale inhibitor additives of the present disclosure including a cationic shale inhibitor and an anion shale inhibitor may provide greater shale inhibition than the individual shale inhibitors at the same concentration. In addition, in certain embodiments, the shale inhibitor additives of the present disclosure may provide effective shale inhibition at high temperatures (e.g., above 150° F.). In certain embodiments, the shale inhibitor additives of the present disclosure may be more compatible with anionic friction reducers than conventional shale inhibitors (e.g., cationic shale inhibitor additives).

As used herein, "shale inhibitor" refers to additives and compounds that may demonstrate a propensity for reducing the tendency of shale or clay to absorb water. In certain embodiments, such additives may also serve as and be referred to as "clay stabilizers," and the components, examples, concentrations, uses, and other descriptions of shale inhibitor additives disclosed herein shall be understood to apply to clay stabilizer additives. For purposes of the claims herein, "shale inhibitor" and "clay stabilizer" shall be deemed interchangeable.

In certain embodiments, a shale inhibitor additive of the present disclosure may include a cationic shale inhibitor and an anionic shale inhibitor. In some embodiments, a clay stabilizer additive of the present disclosure may include a cationic clay stabilizer and an anionic clay stabilizer. As used herein, "cationic shale inhibitor" or "cationic clay stabilizer" refers to a compound or polymer that has a positive charge. As used herein, "anionic shale inhibitor" or "anionic clay stabilizer" refers to a compound or polymer that has a negative charge. In certain embodiments, a shale inhibitor additive or clay stabilizer additive of the present disclosure may include at least one of a cationic shale inhibitor, a cationic clay stabilizer, an anionic shale inhibitor, an anionic clay stabilizer, a nonionic shale inhibitor, a nonionic clay stabilizer, and any combination thereof.

In certain embodiments, a cationic shale inhibitor or cationic shale stabilizer may include, but is not limited to, polydiallyldimethylammonium chloride (PDADMAC), a cationic polyamine, a quaternary ammonium salt, and any combination thereof. In some embodiments, the cationic shale inhibitor may include a polyamine having a molecular weight of from about 1,000 g/mol to about 200,000 g/mol, from about 10,000 g/mol to about 150,000 g/mol, or from about 40,000 g/mol to about 100,000 g/mol. In certain embodiments, the cationic shale inhibitor may include a potassium salt.

In some embodiments, the cationic shale inhibitor may include a block copolymer of diallyidimethyiammonium chloride (DADMAC). For example, a block copolymer of DADMAC may include poly(DADMAC-CQ-aeryiamide). In one or more embodiments, the cationic shale inhibitor includes at least one cationic monomer. As used herein, "cationic monomer" means a monomer that possesses a positive charge. Examples of cationic monomers suitable for certain embodiments of the present disclosure include, but are not limited to DADMAC, (trimethylamino)ethyl acrylates and methacrylates and their quaternary or acid salts, such as (trimethylamino)ethyl acrylate methyl chloride quaternary salt, (trimethylamino)ethyl acrylate methyl sulfate quaternary salt, (trimethylamino)ethyl acrylate benzyl chloride quaternary salt, (trimethylamino)ethyl acrylate sulfuric acid salt, (trimethylamino)ethyl acrylate hydrochloric acid salt, (triethylamino)ethyl acrylate methyl chloride quaternary salt, (trimethylamino)ethyl methacrylate methyl chloride quaternary salt, (trimethylamino) ethyl methacrylate methyl sulfate quaternary salt, (trimethylamino)ethyl methacrylate benzyl chloride quaternary salt, (trimethylamino) ethyl methacrylate sulfuric acid salt, (trimethylamino)ethyl methacrylate hydrochloric acid salt, (trimethylamino)ethyl methacryloyl hydrochloric acid salt, and any combination thereof.

In certain embodiments, the cationic shale inhibitor may include one or more quaternary ammonium salts of the following molecular formula: $R_1R_2R_3R_4N^+X^-$, wherein $R_1$, $R_2$, $R_3$, and $R_4$ may independently be a hydrogen atom or a $C_1$ to $C_3$ hydrocarbyl group, and $X^-$ is selected from the group consisting of: a carboxylate, a halide, a sulfate, an organic sulfonate, a hydroxide, a phosphate, a phosphonate, a borate, and any combination thereof.

In certain embodiments, the anionic shale inhibitor may include a polymer. In certain embodiments, the anionic shale inhibitor may include a polyacrylamide polymer, copolymer, or terpolymer. In some embodiments, the anionic shale inhibitor may include polyacrylic acid. In certain embodiments, the anionic shale inhibitor includes a polyacrylamide copolymer. In some embodiments, the anionic shale inhibitor includes a block copolymer of polyacrylamide and 2-acrylamido-2-methylpropane sulfonic acid (AMPS). AMPS may also be known as 2-acrylamido-tertbutylsulfonic acid (ATBS). In certain embodiments, the shale inhibitor includes poly(acrylamide-co-acrylic acid). In some embodiments, the anionic shale inhibitor may include a polyacrylamide having a molecular weight of from about 1,000 g/mol to about 3,000,000 g/mol, from about 100,000 g/mol to about 2,000,000 g/mol, from about 250,000 g/mol to about 1,000,000 g/mol, or from about 300,000 g/mol to about 750,000 g/mol.

In some embodiments, the shale inhibitor additive may include an additional salt. Examples of additional salts suitable for certain embodiments of the present disclosure include, but are not limited to calcium chloride, sodium chloride, potassium chloride, calcium bromine, ammonium chloride, ammonium nitrate, sodium acetate, and any combination thereof.

In certain embodiments, the components of the shale inhibitor additive may be present in a specific range of concentration ratios. In certain embodiments, a shale inhibitor additive of the present disclosure may provide a synergistic effect such that the mixture outperforms its individual components. In some embodiments, the shale inhibitor additive of the present disclosure may include the cationic shale inhibitor and the anionic shale inhibitor (with or without an additional salt) in a volume ratio of from about 1:2, 1:3, 1:4, or 1:5, to about 1:6, 1:7, 1:8, 1:9, 1:10, 1:11, 1:12, 1:13, 1:14, 1:15, 1:16, 1:17, 1:18, 1:19, or 1:20. In some embodiments, the cationic shale inhibitor may be present in a ratio of about 1:2 to about 1:10, about 1:2 to about 1:20, or about 1:2 to about 1:5, by volume of the anionic shale inhibitor. A person of skill in the art with the benefit of this disclosure would understand what ratio would be appropriate for a particular application, which may include ratios outside these ranges. In some embodiments, the cationic shale inhibitor may be present in the shale inhibitor additive in an amount of from about 1% to about 10%, from about 10% to about 7.5%, from about 2% to about 5%, or from about 3% to about 5%, all by weight of the additive. In certain embodiments, the shale inhibitor additive may include the cationic shale inhibitor in an amount of about 25% or less, 20% or less, 15% or less, 10% or less, or 5% or less, all by weight of the shale inhibitor additive. In some embodiments, the shale inhibitor additive may include the cationic shale inhibitor in an amount of about 1% or more, 2% or more, 3% or more, 4% or more, or 5% or more, all by weight of the shale inhibitor additive.

In certain embodiments, the shale or clay inhibitor additives of the present disclosure may be present in or introduced into treatment fluids in an amount sufficient to provide a desired level of shale inhibition. In some embodiments, the shale inhibitor additive of the present disclosure may be added to the treatment fluid in an amount of from about 0.01 to about 10 gallons per thousand gallons (gpt), from about 0.05 to about 5 gpt, from about 0.1 to about 3 gpt, or from about 0.1 to about 1 gpt, all by volume of the treatment fluid.

In certain embodiments, the shale inhibitor additives of the present disclosure may provide effective shale inhibition at temperatures above 150° F. (65.5° C.), above 175° F. (79.4° C.), above 200° F. (93.3° C.), or above 250° F. (121.1° C.).

In some embodiments, the shale inhibitor additives may be present in or introduced into a treatment fluid that includes an anionic friction reducer. In some embodiments, the anionic friction reducer may include a polymer, copolymer, or terpolymer having an average molecular weight of at least about 4,000,000 g/mol, or of at least about 8,000,000 g/mol. In certain embodiments, the molecular weight of the anionic friction reducing polymers may be in the range of from about 7,500,000 g/mol to about 30,000,000 g/mol. Examples of anionic friction reducers suitable for certain embodiments of the present disclosure include, but are not limited to, a polyacrylamide, acrylic acid, and any combination thereof.

Certain components of the treatment fluid may be provided as a "dry mix" to be combined with a base fluid and/or other components prior to or during introducing the treatment fluid into the subterranean formation. In some embodiments, dry mix compositions may be designed to include a base fluid in an amount from about 1 to about 20 gallons per 94-lb sack of dry blend (gal/sk). In certain embodiments, dry mix compositions may be suitable for base fluids in the amount of 10 gal/sk. In some embodiments, dry mix compositions may be suitable for base fluids in the amount of 13.5 gal/sk. Embodiments of the treatment fluids of the present invention may be prepared in accordance with any suitable technique. In some embodiments, the desired quantity of water may be introduced into a mixer followed by the dry blend. It will be appreciated by those of ordinary skill in the art, with the benefit of this disclosure, other suitable techniques for preparing treatment fluids may be used in accordance with embodiments of the present invention.

In certain embodiments, the treatment fluids and shale inhibitor additives of the present disclosure may be effective over a range of pH levels. For example, in certain embodiments, the shale inhibitor additive of the present disclosure may provide effective shale inhibition from a pH of about 7 to about 12. Additionally, the treatment fluids of the present disclosure may be suitable for a variety of subterranean formations, including, but not limited to shale formations and carbonate formations.

The compositions used in the methods of the present disclosure may include any aqueous or non-aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, oil-in-water emulsions, or any combination thereof. The aqueous fluids may include one or more ionic species, such as those formed by salts dissolved in water. For example, seawater and/or produced water may include a variety of divalent cationic species dissolved therein. Examples of suitable oleaginous fluids that may be included in the oleaginous-based fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and any combination thereof.

In certain embodiments, the additives or treatment fluids of the present disclosure may include a solvent. Examples of solvents suitable for certain embodiments of the present disclosure include, but are not limited to an alcohol, a glycol, polyethylene glycol, acetone, and any combination thereof. In some embodiments, the solvent may include water.

As used herein, the term "treatment fluid" refers to any fluid that may be used in an application in conjunction with a desired function and/or for a desired purpose. The term "treatment" does not imply any particular action by the fluid or any component thereof. The treatment fluids generally include a base fluid. Treatment fluids that may be useful in accordance with the present disclosure include, but are not limited to, fracturing fluids, gravel packing fluids, pre-pad fluids, pad fluids, preflush fluids, afterflush fluids, acidic fluids, consolidation fluids, cementing fluids, wellbore clean-out fluids, conformance fluids, aqueous fluids (e.g., fresh water, salt water, brines, etc.), non-aqueous fluids (e.g., mineral oils, synthetic oils, esters, etc.), hydrocarbon-based fluids (e.g., kerosene, xylene, toluene, diesel, oils, etc.), foamed fluids (e.g., a liquid that includes a gas), gels, emulsions, gases, and the like. In one or more embodiments, the treatment fluid may have a pH within a range of from about 4 to about 8. In one or more embodiments, the treatment fluid may have a pH within a range of from about 5 to about 10. In other embodiments, the treatment fluid including the corrosion inhibitor additive may have a pH greater than 4, 5, 6, 7, 8, or 9.

In certain embodiments, the methods and compositions of the present disclosure optionally may include any number of additional additives. Examples of such additional additives include, but are not limited to, additional salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, viscosifiers, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates at least a portion of a subterranean formation. In certain embodiments, a wellbore may be drilled and the treatment fluid may be circulated in the wellbore during, before, or after the drilling. In some embodiments, the treatment fluid may be introduced at a pressure sufficient to create or enhance one or more fractures within the subterranean formation (e.g., hydraulic fracturing). In certain embodiments, the methods and compositions of the present disclosure may include a treatment fluid introduced into at least a portion of the wellbore or subterranean formation having a temperature of 150° F. (65.5° C.) or higher, 175° F. (79.4° C.) or higher, 200° F. (93.3° C.) or higher, or 250° F. (121.1° C.) or higher.

The methods and compositions of the present disclosure may directly or indirectly affect one or more components or pieces of equipment associated with the preparation, delivery, recapture, recycling, reuse, and/or disposal of the compositions of the present disclosure. For example, the methods and compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the compositions of the present disclosure. The methods and compositions of the present disclosure may also directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a friction reducer with fluid (e.g., liquid or substantially liquid) from fluid source 30, to produce a fracturing fluid that is used to fracture the formation. The hydrated fracturing fluid can be a fluid ready for use in a fracture stimulation treatment of the well 60 or a concentrate to which additional fluid is added prior to use in a fracture stimulation of the well 60. In some embodiments, the fracturing fluid producing apparatus 20 can be omitted and the fracturing fluid sourced directly from the fluid source 30. In certain embodiments, the fracturing fluid may include water, a hydrocarbon fluid, a polymer gel, foam, air, gases and/or other fluids. For example, in certain embodiments, the fracturing fluid may include gases, including but not limited to carbon dioxide, nitrogen, natural gas, and any combination thereof. In some embodiments, a gas fracturing fluid may include a pure gas fracturing fluid (a fluid including nearly 100% gas), a mist (a mixture including approximately 95% gas carrying a liquid phase), a foam or emulsion (a mixture including from about 50% to about 95% gas formed within a continuous liquid phase), or an energized fluid (a mixture composed of from about 5% to about 50% gas in a liquid phase).

The proppant source 40 can include a proppant for combination with the fracturing fluid. The system may also include additive source 70 that provides one or more additives (e.g., the shale inhibitor additives or clay stabilizer additives of the present disclosure, gelling agents, weighting agents, and/or other additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions. In certain embodiments, the other additives 70 may include a shale inhibitor additives and/or clay stabilizer additive of the present disclosure.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particles, and/or other compositions to the pumping and blender system 50. Such metering devices may permit the pumping and blender system 50 to source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppant particles at other times, and combinations of those components at yet other times.

Figure 2:
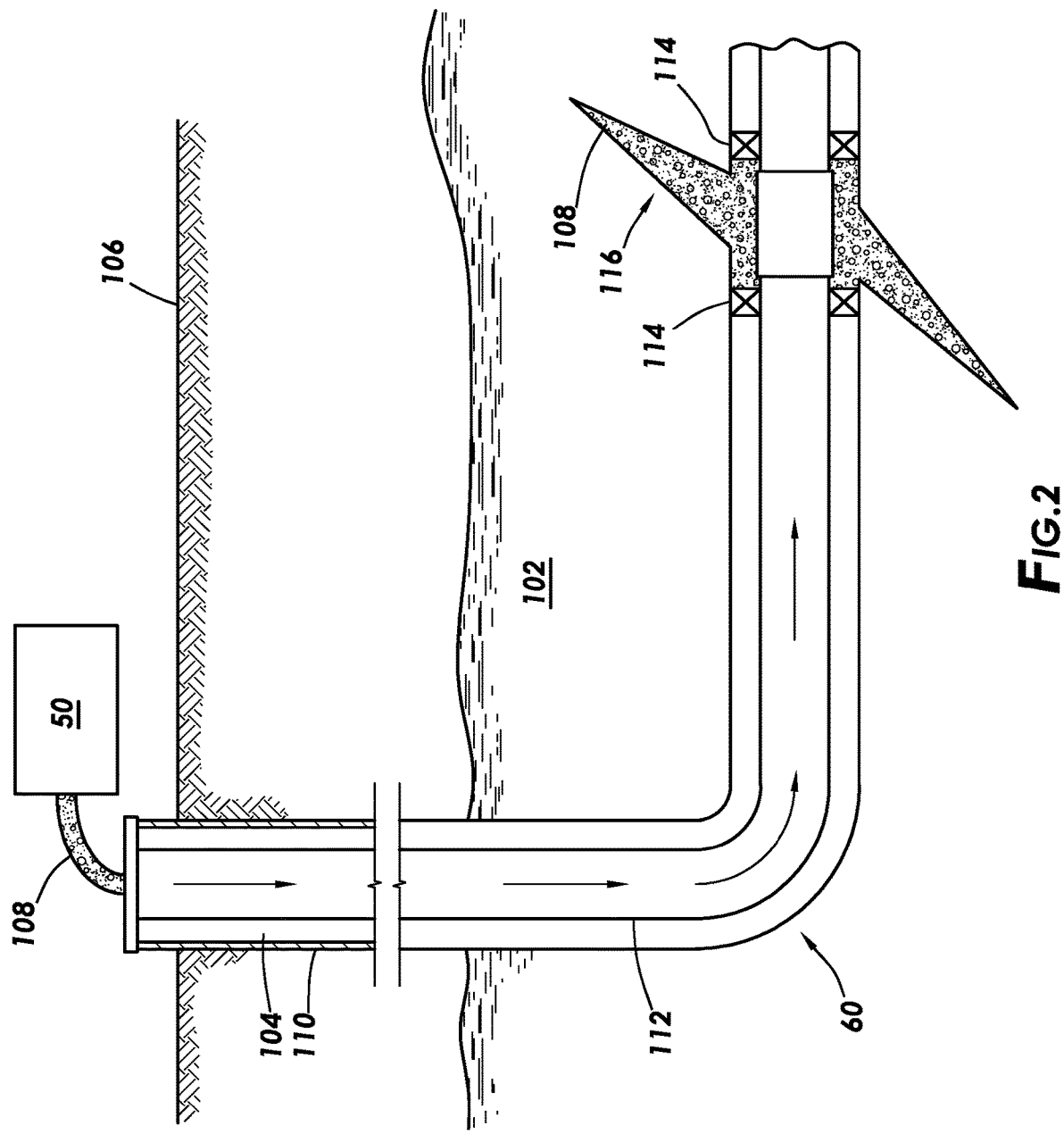
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled to a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to communicate the fracturing fluid 108 directly into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppant particulates (and/or treatment particulates of the present disclosure) in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

The methods and compositions of the present disclosure may also directly or indirectly affect the various downhole equipment and tools that may come into contact with the fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

In certain embodiments, the fluids may be formed at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of at least one other component so that the streams are combined and mixed while continuing to flow as a single stream as part of the ongoing treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

An embodiment of the present disclosure is a method that includes: introducing an additive including a cationic shale inhibitor and an anionic shale inhibitor into a treatment fluid, wherein the cationic shale inhibitor is present in the additive at a ratio of about 1:2 to about 1:10 by volume of the anionic shale inhibitor; and introducing the treatment fluid into a wellbore penetrating at least a portion of a subterranean formation.

In one or more embodiments described in the preceding paragraph, the cationic shale inhibitor is selected from the group consisting of: polydiallyldimethylammonium chloride, a cationic polyamine, a quaternary ammonium salt, and any combination thereof. In one or more embodiments described in the preceding paragraph, the cationic shale inhibitor includes a cationic polyamine having a molecular weight of from about 1,000 g/mol to about 200,000 g/mol. In one or more embodiments described in the preceding paragraph, the anionic shale inhibitor includes a polyacrylamide polymer, copolymer, or terpolymer. In one or more embodiments described in the preceding paragraph, the treatment fluid is introduced into at least a portion of the wellbore or subterranean formation having a temperature of 150° F. or higher. In one or more embodiments described in the preceding paragraph, wherein the additive further includes a salt selected from the group consisting of: calcium chloride, sodium chloride, potassium chloride, calcium bromine, ammonium chloride, ammonium nitrate, sodium acetate, and any combination thereof. In one or more embodiments described in the preceding paragraph, the additive is added to the treatment fluid in an amount of from about 0.01 to about 10 gpt by volume of the treatment fluid. In one or more embodiments described in the preceding paragraph, the treatment fluid includes an anionic friction reducer. In one or more embodiments described in the preceding paragraph, the cationic shale inhibitor is present in the additive in an amount of from about 1% to about 10% by weight of the additive.

An embodiment of the present disclosure is a method that includes: drilling at least a portion of a wellbore to penetrate at least a portion of a subterranean formation that includes shale; circulating a drilling fluid in at least the portion of the wellbore while drilling at least the portion of the wellbore, the drilling fluid including a base fluid, a cationic shale inhibitor, and an anionic shale inhibitor; and allowing the shale inhibitor to interact with the shale in the subterranean formation to at least partially inhibit the shale.

In one or more embodiments described in the preceding paragraph, the cationic shale inhibitor is selected from the group consisting of: polydiallyldimethylammonium chloride, a cationic polyamine, a quaternary ammonium salt, and any combination thereof.

In one or more embodiments described in the preceding paragraph, the cationic shale inhibitor includes a cationic polyamine having a molecular weight of from about 1,000 g/mol to about 200,000 g/mol. In one or more embodiments described in the preceding paragraph, the anionic shale inhibitor includes a polyacrylamide polymer, copolymer, or terpolymer. In one or more embodiments described in the preceding paragraph, the drilling fluid includes an anionic friction reducer. In one or more embodiments described in the preceding paragraph, the additive further includes a solvent selected from the group consisting of: an alcohol, a glycol, polyethylene glycol, acetone, and any combination thereof.

An embodiment of the present disclosure is a method that includes: introducing a treatment fluid into a wellbore penetrating at least a portion of a subterranean formation that includes clay at or above a pressure sufficient to create or enhance one or more fractures in the subterranean formation, wherein the treatment fluid includes: a base fluid, and a clay stabilizer additive including a cationic clay stabilizer and an anionic clay stabilizer; and allowing the clay stabilizer additive to interact with the clay in the subterranean formation to at least partially inhibit the clay.

In one or more embodiments described in the preceding paragraph, the cationic clay stabilizer is selected from the group consisting of: polydiallyldimethylammonium chloride, a cationic polyamine, a quaternary ammonium salt, and any combination thereof. In one or more embodiments described in the preceding paragraph, the cationic shale inhibitor includes a cationic polyamine having a molecular weight of from about 1,000 g/mol to about 200,000 g/mol. In one or more embodiments described in the preceding paragraph, the anionic shale inhibitor includes a polyacrylamide polymer, copolymer, or terpolymer. In one or more embodiments described in the preceding paragraph, the treatment fluid is introduced into at least a portion of the wellbore or subterranean formation having a temperature of 150° F. or higher.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

A sample shale inhibitor additive of the present disclosure including polydiallyldimethylammonium chloride (PDADMAC), polyacrylamide, and calcium chloride was tested to determine compatibility and stability with anionic friction reducers, and to measure shale and clay inhibition performance.

EXAMPLE 1

In this example, compatibility and stability testing was performed for the sample shale inhibitor additive and various anionic friction reducers through a blender test. These results were compared against mixtures of the same anionic friction reducers with only a cationic shale inhibitor and against mixtures of the same anionic friction reducers with only an anionic shale inhibitor.

Each mixture was prepared by adding 0.5 gallons per thousand gallons (gpt) of a shale inhibitor additive to 500 ml of tap water and mixing the solution in a blender at low shear for 1 minute. Following this, 0.5 gpt of an anionic friction reducer was introduced into the mixture and blended at low shear for 1 minute. The samples were then transferred to a clear bottle and precipitation was monitored over a period of 16 hours. Compatibility was determined by observing the samples for evidence of precipitation. A material was considered compatible when little or no precipitation was observed after 16 hours.

Tables 1-3 show the results of the compatibility testing for different shale inhibitor additives exposed to three different anionic emulsion-based friction reducers. Anionic friction reducer product #1 and anionic friction reducer product #2 are high viscosity anionic emulsion-based friction reducers. The anionic shale inhibitor was a polyacrylamide shale inhibitor. The cationic shale inhibitor was polydiallyldimethylammonium chloride (PDADMAC) and proved incompatible with all three tested anionic friction reducers when used on its own. Precipitation was observed on all samples containing only the cationic shale inhibitor even when dosed with a low concentration. In contrast, the shale inhibitor additive of the present disclosure (a 1:5 volume ratio of a cationic shale inhibitor and an anionic shale inhibitor) exhibited no precipitation in any of those samples.

TABLE 1

Blender Compatibility Test Results of Various Shale Inhibitors with Anionic Friction Reducer Product #1

| Cationic shale inhibitor (gpt) | Anionic shale inhibitor (gpt) | Sample shale inhibitor additive (1:5) (gpt) | Anionic friction reducer product #1 (gpt) | Precipitation Observed |
|---|---|---|---|---|
| — | — | 1 | 1 | No |
| — | 1.0 | — | 1 | No |
| 0.2 | — | — | 1 | Yes |
| — | — | — | 1 | No |

TABLE 2

Blender Compatibility Test Results of Various Shale Inhibitors with Anionic Friction Reducer Product #2

| Cationic shale inhibitor (gpt) | Anionic shale inhibitor (gpt) | Sample shale inhibitor additive (1:5) (gpt) | Anionic friction reducer product #2 (gpt) | Precipitation Observed |
|---|---|---|---|---|
| — | — | 1 | 1 | No |
| — | 1.0 | — | 1 | No |
| 0.2 | — | — | 1 | Yes |
| — | — | — | 1 | No |

TABLE 3

Blender Compatibility Test Results of Various Shale Inhibitors with Anionic Friction Reducer Product #3

| Cationic shale inhibitor (gpt) | Anionic shale inhibitor (gpt) | Sample shale inhibitor additive (1:5) (gpt) | Anionic friction reducer product #3 (gpt) | Precipitation Observed |
|---|---|---|---|---|
| — | — | 1 | 1 | No |
| — | 1.0 | — | 1 | No |
| 0.2 | — | — | 1 | Yes |
| — | — | — | 1 | No |

EXAMPLE 2

In this example, further compatibility testing was performed for the shale inhibitor additive of the present disclosure to measure the friction reduction performance of the same anionic friction reducers of Example 1 when mixed with the shale inhibitor additive of the present disclosure. The test consisted of using a laboratory scale friction flow loop apparatus to measure the friction reduction performance of the anionic friction reducers in the presence of the sample shale inhibitor additive of the present disclosure. Friction flow loop testing is typically conducted to evaluate the friction reduction performance of friction reducers. This test helps predict the friction reduction performance of the friction reducers in the treatment or source water, which may ultimately affect treating pressures and the hydraulic horsepower requirements during a stimulation job. The friction loop apparatus consisted of a 0.5 inch-diameter smooth pipe test section. The test solution was circulated at 10 liters per minute.

Figure 3:
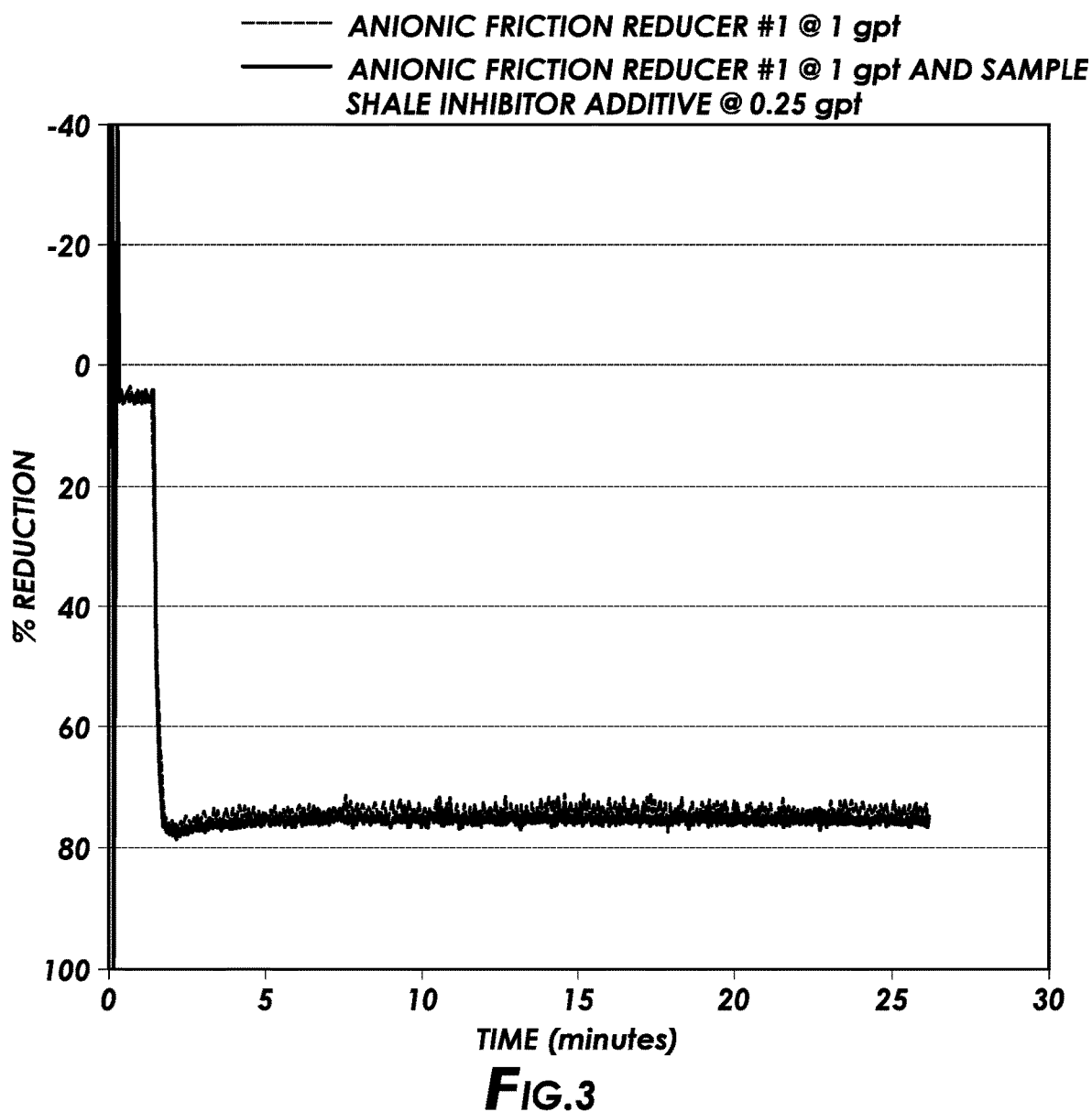
FIG. 3 is a plot showing the compatibility of shale inhibitor additives of the present disclosure with anionic friction reducers in water in accordance with certain embodiments of the present disclosure.
Figure 4:
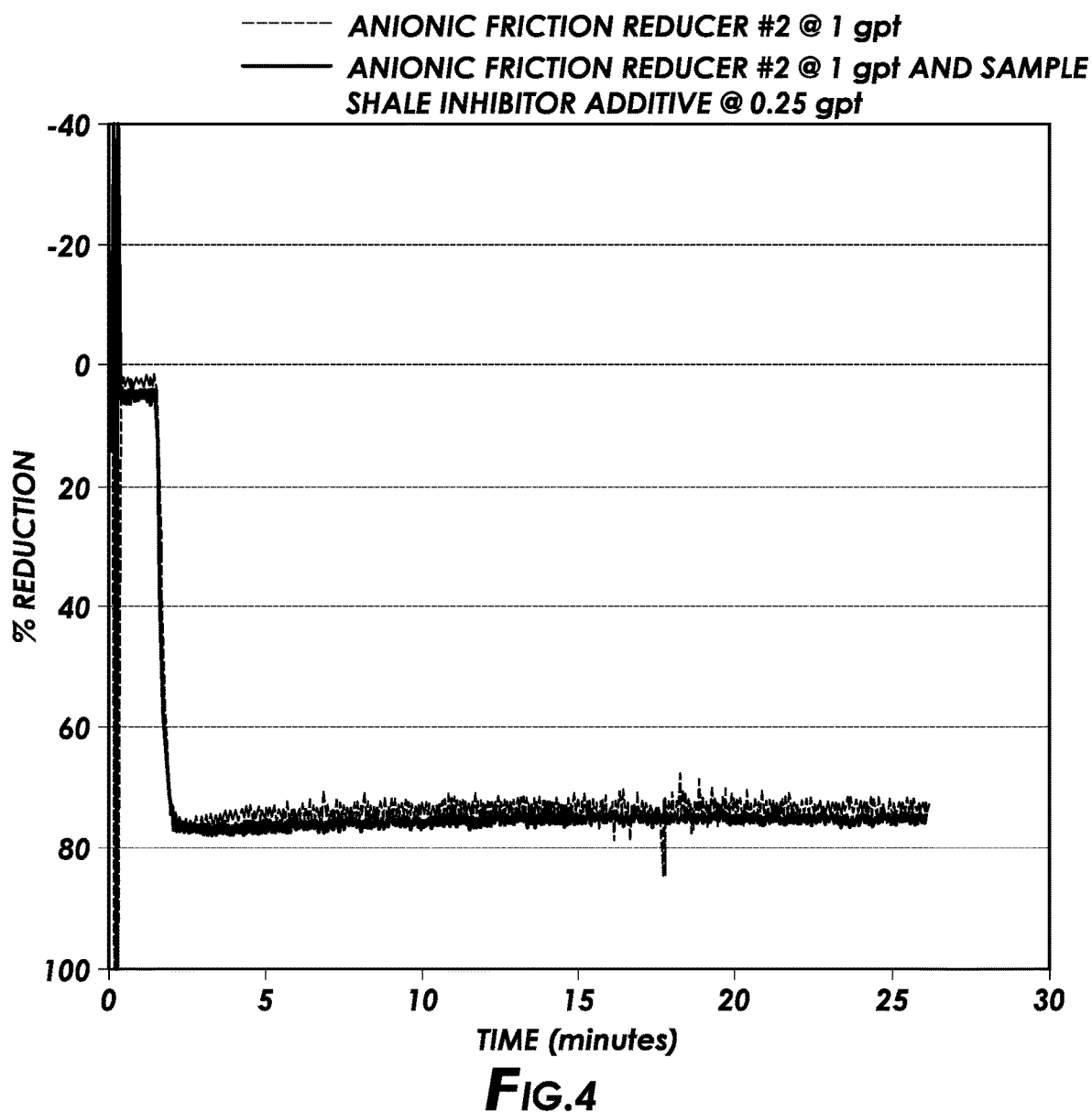
FIG. 4 is a plot showing the compatibility of shale inhibitor additives of the present disclosure with anionic friction reducers in water in accordance with certain embodiments of the present disclosure.
Figure 5:
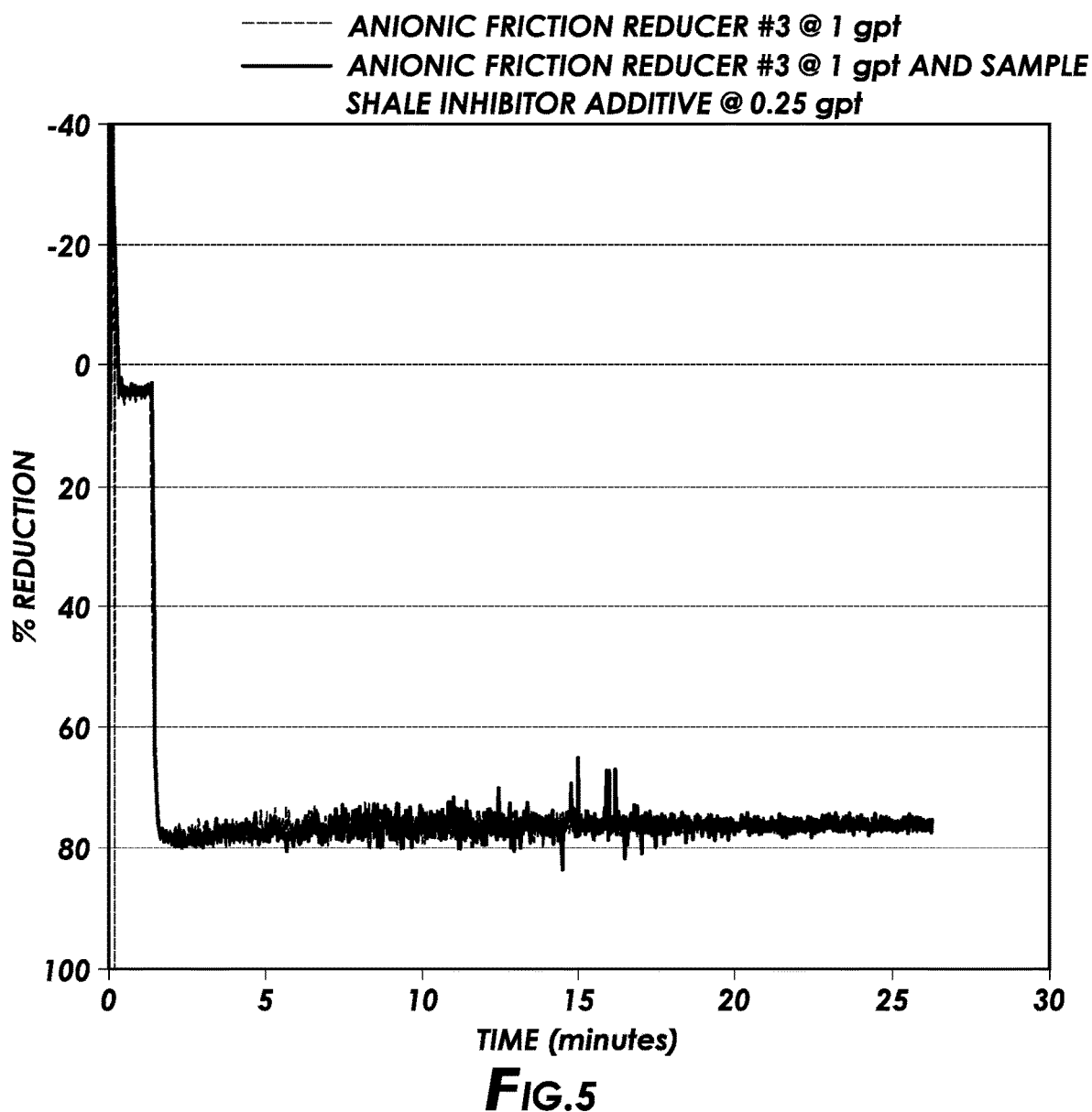
FIG. 5 is a plot showing the compatibility of shale inhibitor additives of the present disclosure with anionic friction reducers in water in accordance with certain embodiments of the present disclosure.
Figure 6:
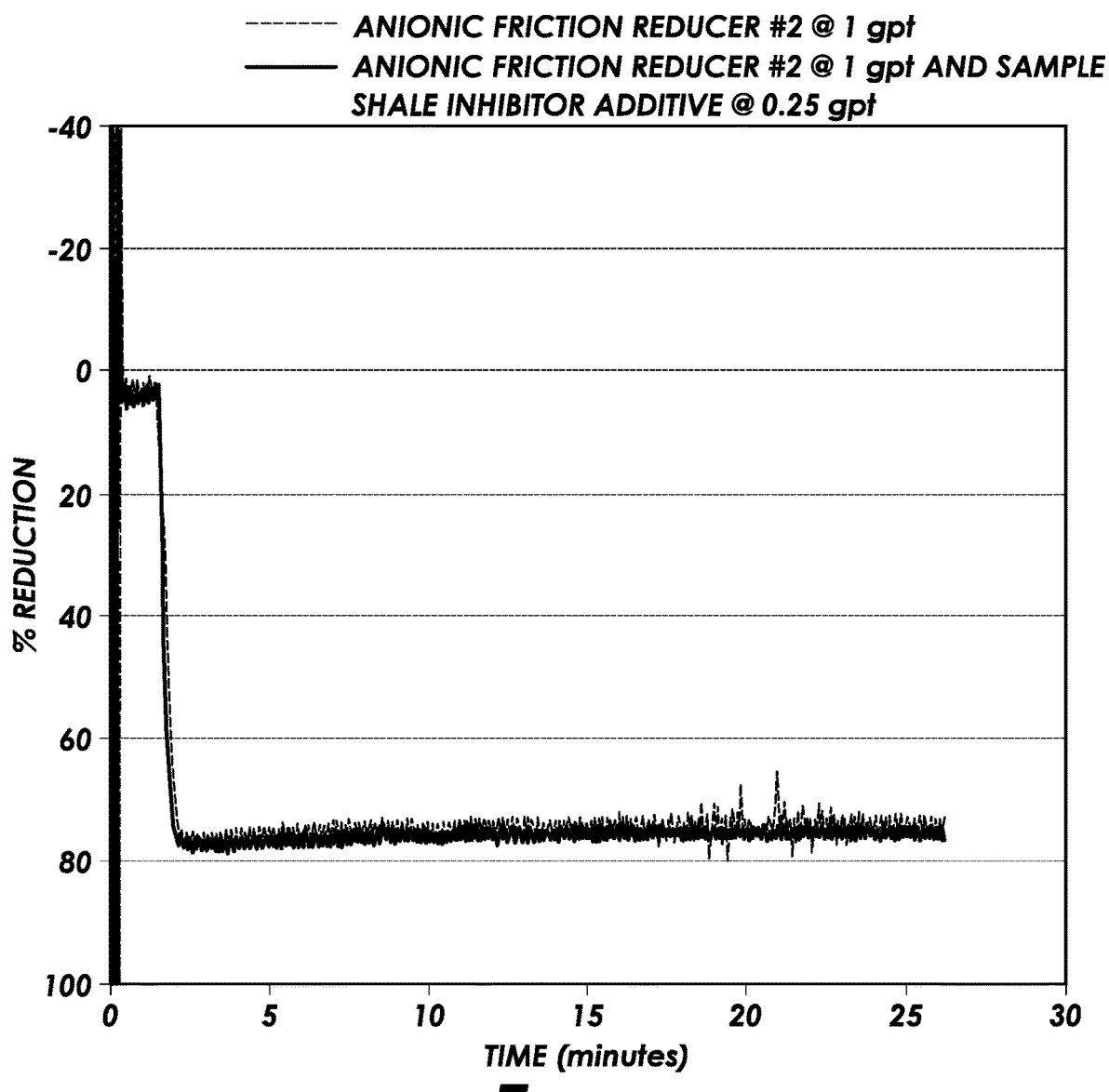
FIG. 6 is a plot showing the compatibility of shale inhibitor additives of the present disclosure with anionic friction reducers in synthetic brine in accordance with certain embodiments of the present disclosure.

For this test, the three anionic friction reducers from Example 1 were added to either tap water or a synthetic brine at 1 gpt with the sample shale inhibitor additive dosed at 0.25 gpt. FIGS. 3-5 depict the friction reduction performance results of each anionic friction reducer alone in tap water compared to both the anionic friction reducer and the sample shale inhibitor additive in tap water. FIG. 6 depicts the friction reduction performance results of the second anionic friction reducer from Example 1 alone in a synthetic brine compared to both the anionic friction reducer and the sample shale inhibitor additive in the same synthetic brine. The synthetic brine had a total dissolved solids of around 350 ppm, and was chosen to simulate produced field water.

FIGS. 3-6 show that the addition of the shale inhibitor additive does not interfere with the friction reduction performance of any of the anionic friction reducers in either tap water or a synthetic brine. In fact, FIGS. 3 and 4 show that the first and second anionic friction reducers performed better in the presence of the shale inhibitor additive of the present disclosure.

EXAMPLE 3

Figure 7:
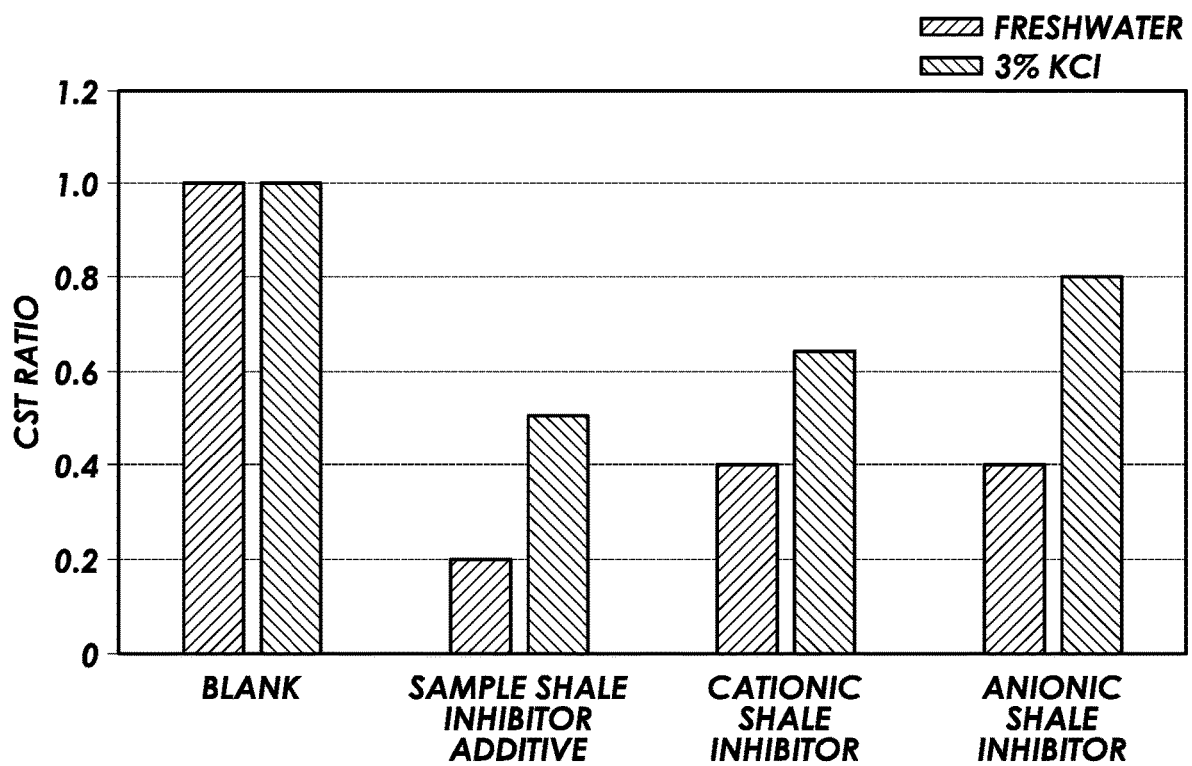
FIG. 7 is a plot showing the shale inhibition performance of shale inhibitor additives of the present disclosure in a bentonite slurry in accordance with certain embodiments of the present disclosure.

In this example, Capillary Suction Test (CST) testing was performed to determine the capacity of the shale inhibitors of the present disclosure to prevent clay and/or shale swelling. Slurries of bentonite clay in freshwater and a 3 wt % potassium chloride brine were separately mixed with a cationic shale inhibitor, an anionic polyacrylamide shale inhibitor, and the sample shale inhibitor additive of the present disclosure. The slurries were then introduced into CST equipment that measured the travel time of the slurry across a thick porous filter paper at room temperature and ambient pressure. The CST ratios (i.e., the ratio of CST time between the sample and the CST time of the blank) of each shale inhibitor or shale inhibitor additive was calculated. A low CST ratio indicates that an inhibitor is effective (e.g., that it can favorably exchange at clay or shale sites and flocculate the clays or shale). FIG. 7 shows the results for these tests, which demonstrate that all of the samples containing shale inhibitors performed better than the blank. In addition, FIG. 7 shows that the sample shale inhibitor additive of the present disclosure performed best among all the samples tested in both freshwater and the potassium chloride brine. That is, the sample shale inhibitor additive of the present disclosure showed better inhibition than its individual components at the same concentration, demonstrating a synergistic effect between the cationic shale inhibitor and anionic shale inhibitor.

EXAMPLE 4

In this example, high temperature and high pressure shale inhibition performance of the sample shale inhibitor additive of the present disclosure was assessed against the inhibition performance of a blank sample (i.e., no shale inhibitor) and samples with only a cationic shale inhibitor or only an anionic shale inhibitor. Shale inhibition performance was evaluated by bentonite hydration suppression and bentonite sedimentation testing.

Samples were prepared for the bentonite hydration suppression testing by mixing 1 gpt of the cationic shale inhibitor, anionic polyacrylamide shale inhibitor, or shale inhibitor additive of the present disclosure with a 10 wt % freshwater bentonite slurry. The mixtures were blended in a multimixer for 5 minutes, hot rolled, and then aged for 4 hours at 250° F. and 300 psi. The performance of each sample was then determined by measuring its rheological properties and fluid loss properties. Rheology of the samples was evaluated by measuring yield point in lb/100 sq ft with a FANN 35 Rheometer based on the difference between the readings at 600 rotations per minute ("RPM") and 300 RPM, according to API recommended practice on the rheology of oil-well drilling fluids. Fluid loss was determined in accordance with the API Fluid Loss filtration test procedure.

Figure 8:
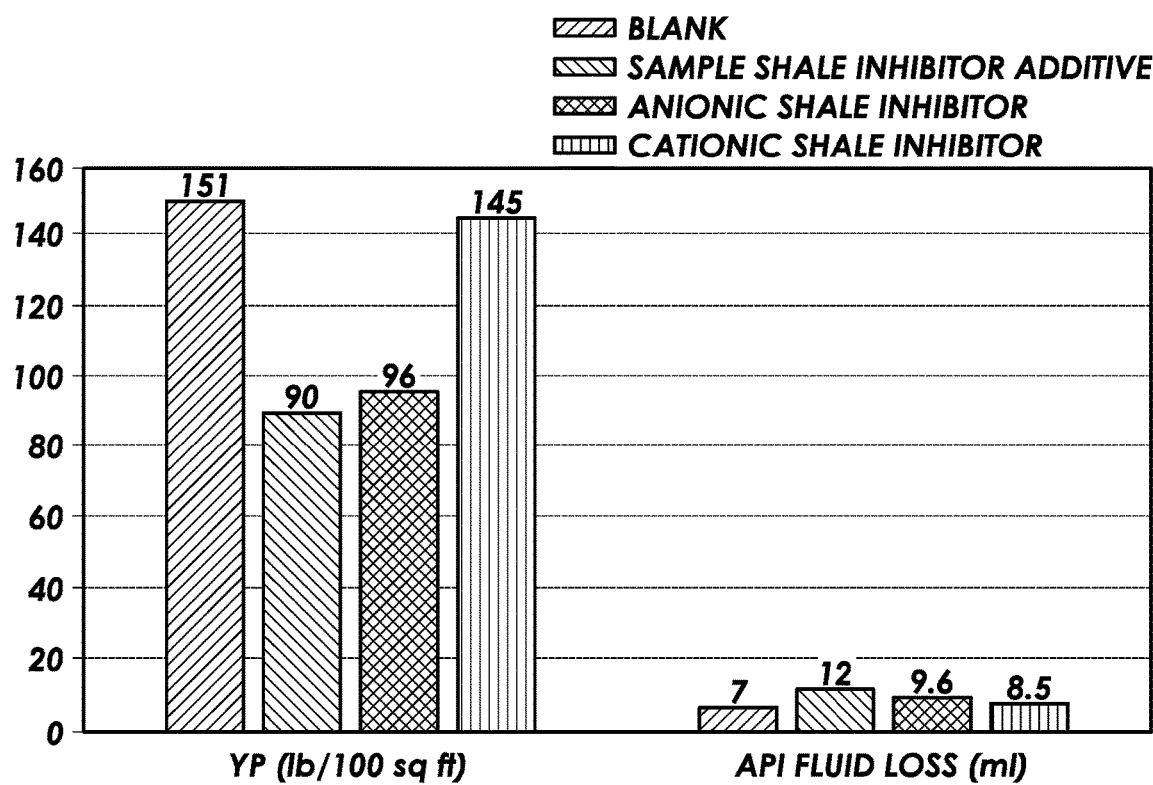
FIG. 8 is a plot showing the results of bentonite hydration suppression tests for different shale inhibitors of the present disclosure in freshwater in accordance with certain embodiments of the present disclosure.

Samples with good clay and shale inhibition properties should show lower rheology (i.e., low yield point values) and higher fluid loss. FIG. 8 shows the rheology and fluid loss results for each sample compared against the blank. As shown, FIG. 8 demonstrates that the sample shale inhibitor additive of the present disclosure presented the best clay and shale inhibition properties, significantly better than the control and better than the cationic and anionic shale inhibitors alone, as indicated by the lowest yield point values and highest fluid loss.

Figure 9:
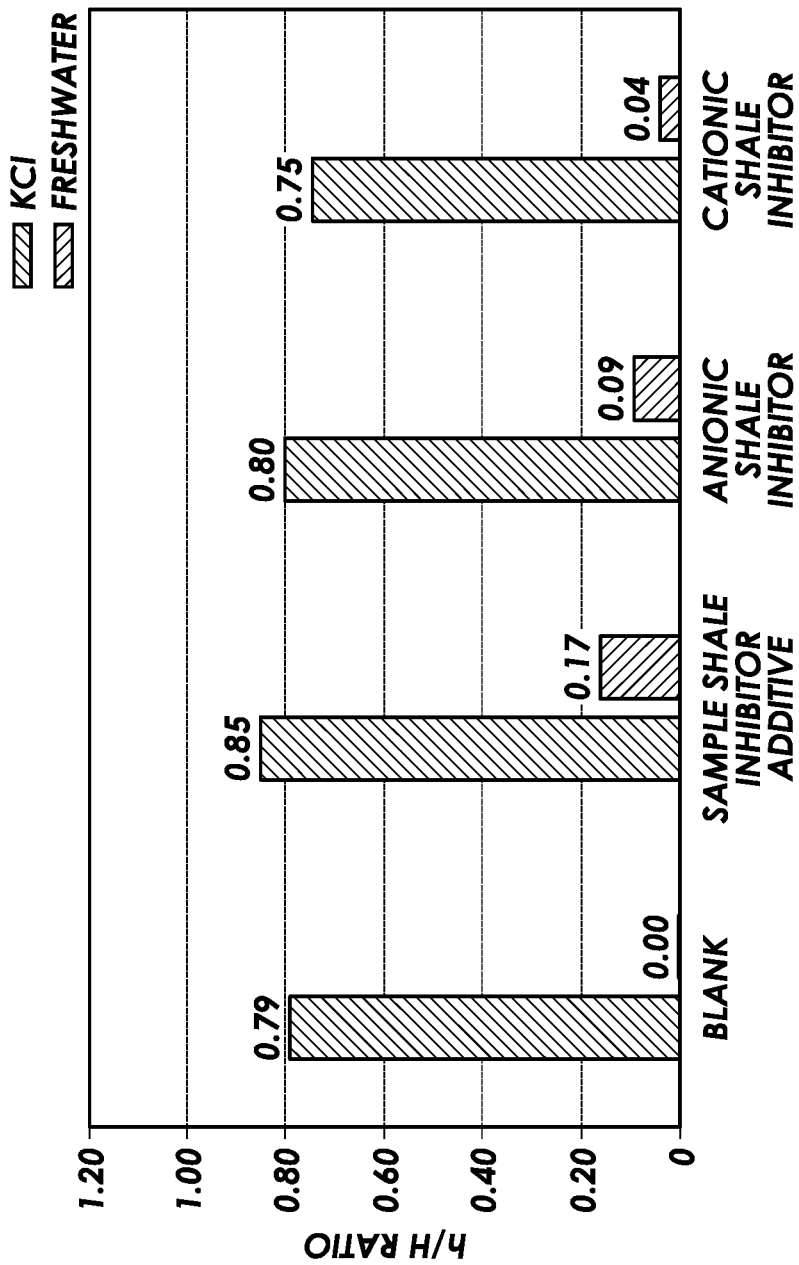
FIG. 9 is a plot showing the results of bentonite sedimentation tests for shale inhibitor additives of the present disclosure in accordance with certain embodiments of the present disclosure.

The bentonite sedimentation test measured the stability of dispersed clay (i.e., bentonite) in an aqueous slurry in the presence of the different shale inhibitors at elevated temperatures and pressures. In this test, 3 wt % of bentonite powder was added to various freshwater and potassium chloride brine solutions containing the shale inhibitor additive of the present disclosure, the cationic shale inhibitor of that additive, or the anionic shale inhibitor in concentrations of 1 gpt. The mixtures were stirred for 5 minutes and then transferred to a glass insert. The samples were then static aged for 18 hours at 250° F. and 300 psi. Stability was measured by measuring the distance from the clearly formed horizontal interference between the sediment and the supernatant (h) and dividing it by the total height of the fluid (H). A higher h/H ratio indicates better stability of dispersed clay and thus better clay inhibition. FIG. 9 shows the results of the bentonite sedimentation tests. FIG. 9 demonstrates that the sample shale inhibitor additive of the present disclosure exhibited the highest stability among all the samples tested at elevated temperature and pressure.

EXAMPLE 5

In this example, the formation stability and capillary suction performance of the sample shale inhibitor additive in various formation samples was compared to two other clay stabilizer additives.

Figure 10:
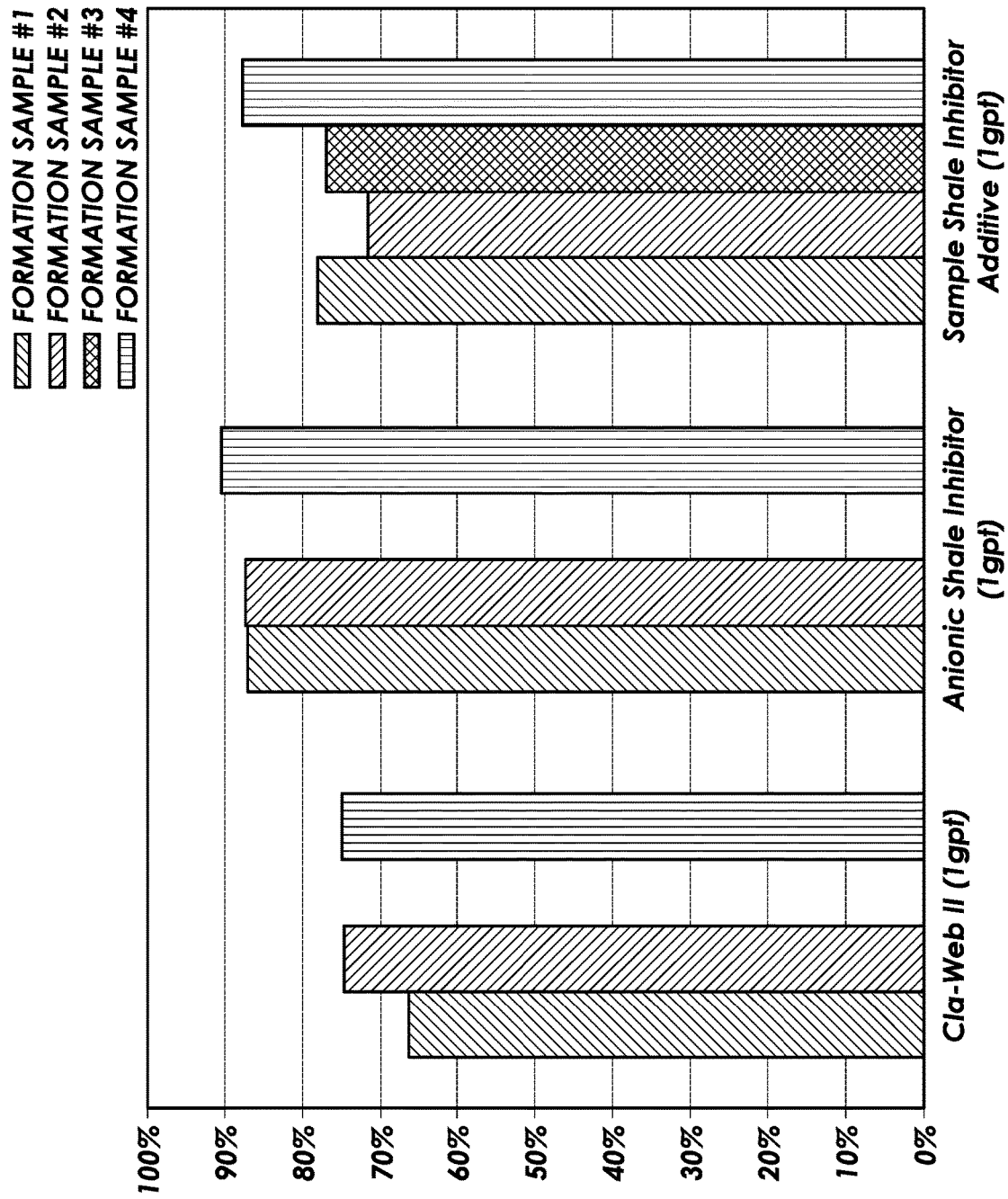
FIG. 10 is a plot showing the results of formation stability tests for shale inhibitor additives of the present disclosure in accordance with certain embodiments of the present disclosure.

For the formation stability testing, formation cuttings were mixed with shale inhibitor solutions to determine turbidity performance compared to fresh water. Three shale inhibitors were tested: CLA-WEB™ II, a anionic polyacrylamide shale inhibitor, and the sample shale inhibitor additive of the present disclosure. CLA-WEB™ II is a clay stabilization additive, commercially available from Halliburton Energy Services, Inc. The formation cuttings were taken from four different formations and were sieved so that they would pass through a 30 mesh sieve but not a 40 mesh sieve. Test solutions were prepared by adding the shale inhibitors to deionized water in concentrations of 1 gpt by volume of the solution and mixing. Fifteen milliliters of each mixture of each shale inhibitor and deionized water mixture were combined with 0.25 g of sieved cuttings in glass vials. Initial turbidity was measured after the vials were sealed and shaken. Sample vials were then placed in a lab rotator so the vials rotated end-over-end at 15 rotations per minute (rpm) for 10 minutes. After 10 minutes, turbidity was measured again. The vials were rotated for an additional 1 hour and 50 minutes at 15 rpm (for a total rotation period of 2 hours), and turbidity was measured one final time. The final turbidity measurements were taken in duplicate and averaged, and then compared to the turbidity values of a control sample that contained 1 gpt of fresh water instead of a shale inhibitor additive. FIG. 10 shows the results for each turbidity test as a percentage improvement over the control sample.

Figure 11:
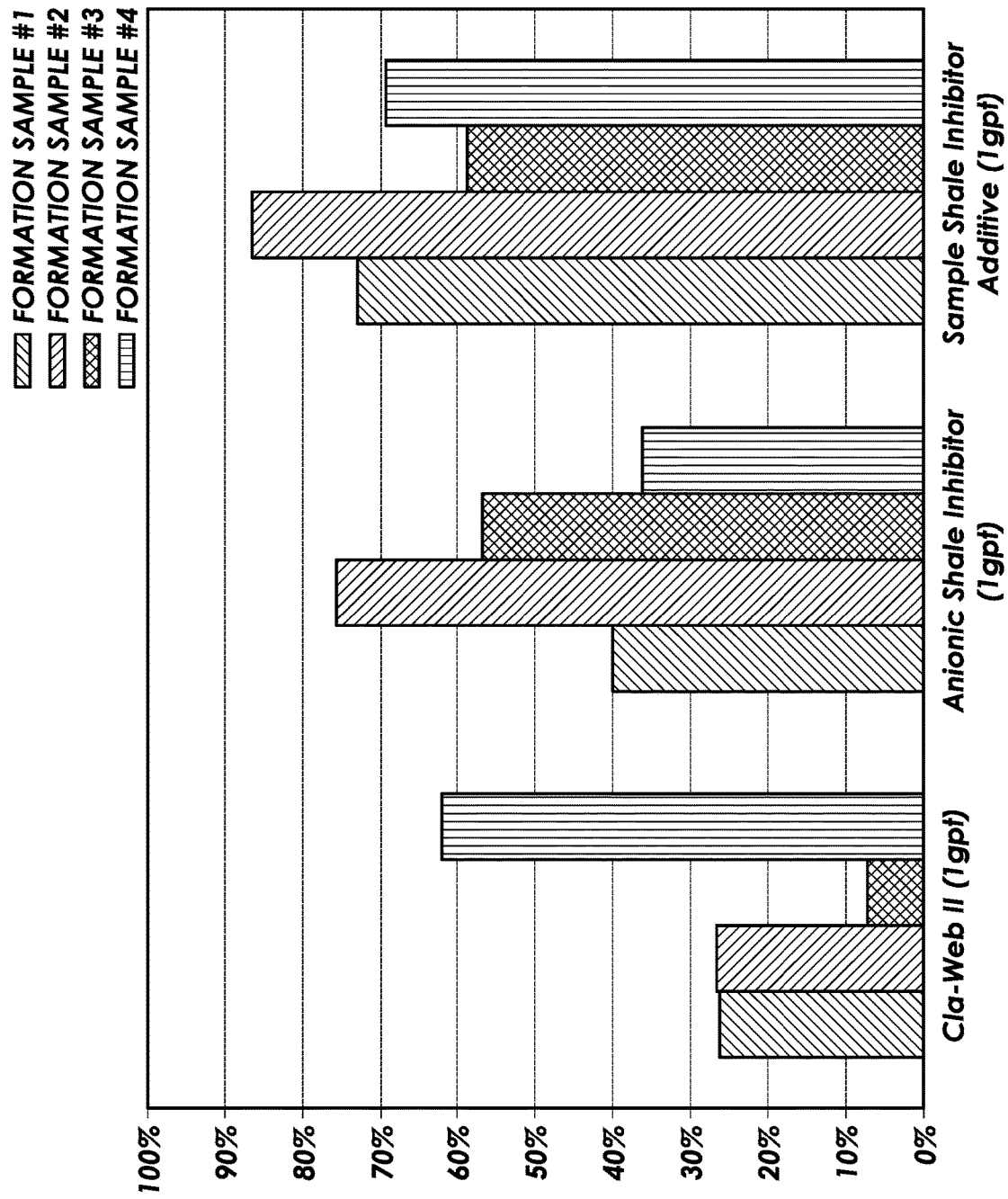
FIG. 11 is a plot showing the results of capillary suction tests for shale inhibitor additives of the present disclosure in accordance with certain embodiments of the present disclosure.

For the CST testing, slurries of clay from four different formation samples were separately mixed in freshwater with three shale inhibitors: CLA-WEB™ II, an anionic polyacrylamide shale inhibitor, and the sample shale inhibitor additive of the present disclosure. The additives were present in the test slurries in concentrations of 1 gpt by volume of the slurry. The slurries were introduced into CST equipment that measured the travel time of the slurry across a thick porous filter paper at room temperature and ambient pressure. FIG. 11 shows the results for each test as a percentage improvement over a control sample that contains 1 gpt of fresh water instead of a shale inhibitor additive. FIG. 11 demonstrates that the sample shale inhibitor additive of the present disclosure increased shale inhibition over water for all formation samples, moreso than CLA-WEB™ II in three out of four formation samples.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method of fracture stimulation comprising:
    introducing an anionic friction reducer and an additive comprising a salt, a cationic shale inhibitor, and an anionic shale inhibitor into a treatment fluid, wherein the cationic shale inhibitor is present in the additive at a ratio of about 1:2 to about 1:5 by volume of the anionic shale inhibitor,
    wherein the cationic shale inhibitor is selected from the group consisting of:
    polydiallyldimethylammonium chloride; a cationic polyamine; a quaternary ammonium salt; and any combination thereof,
    wherein the anionic shale inhibitor is selected from the group consisting of: polyacrylamide polymer, copolymer, or terpolymer; polyacrylic acid; polyacrylamide copolymer; a block copolymer of polyacrylamide and 2-acrylamido-2-methylpropane sulfonic acid (AMPS); 2-acrylamido-tertbutylsulfonic acid (ATBS); poly(acrylamide-co-acrylic acid); and any combination thereof;
    wherein the salt is selected from the group consisting of: calcium chloride, sodium chloride, potassium chloride, calcium bromine, ammonium chloride, ammonium nitrate, sodium acetate, and any combination thereof;

wherein the cationic shale inhibitor is present in the additive in an amount of about 2% to about 5% by weight of the additive;

introducing the treatment fluid into a wellbore penetrating at least a portion of a subterranean formation that comprises shale at or above a pressure sufficient to create or enhance one or more fractures in the subterranean formation; and allowing the additive to interact with the shale in the subterranean formation to at least partially inhibit the shale.

2. The method of claim 1, wherein the cationic shale inhibitor comprises a cationic polyamine having a molecular weight of from about 1,000 g/mol to about 200,000 g/mol.

3. The method of claim 1, wherein the treatment fluid is introduced into at least a portion of the wellbore or subterranean formation having a temperature of 150° F. or higher.

4. The method of claim 1, wherein the additive is added to the treatment fluid in an amount of from about 0.01 to about 10 gallons per thousand gallons by volume of the treatment fluid.

5. The method of claim 1, wherein the cationic shale inhibitor is present in the additive in an amount of from about 1% to about 10% by weight of the additive.

6. A method of fracture stimulation comprising:

introducing a treatment fluid into a wellbore penetrating at least a portion of a subterranean formation that comprises clay at or above a pressure sufficient to create or enhance one or more fractures in the subterranean formation, wherein the treatment fluid comprises:

a base fluid;

proppant;

an anionic friction reducer; and an additive comprising a salt, a cationic clay stabilizer, and an anionic clay stabilizer, wherein the cationic clay stabilizer is selected from the group consisting of:

polydiallyldimethylammonium chloride; a cationic polyamine; a quaternary ammonium salt; and any combination thereof;

wherein the anionic clay stabilizer is selected from the group consisting of:

polyacrylamide polymer, copolymer, or terpolymer; polyacrylic acid; polyacrylamide copolymer; a block copolymer of polyacrylamide and 2-acrylamido-2-methylpropane sulfonic acid (AMPS); 2-acrylamido-tertbutylsulfonic acid (ATBS); poly(acrylamide-co-acrylic acid); and any combination thereof;

wherein the salt is selected from the group consisting of: calcium chloride, sodium chloride, potassium chloride, calcium bromine, ammonium chloride, ammonium nitrate, sodium acetate, and any combination thereof;

wherein the cationic shale inhibitor is present in the additive in an amount of about 2% to about 5% by weight of the additive; and allowing the additive to interact with the clay in the subterranean formation to at least partially inhibit the clay.

7. The method of claim 6, wherein the cationic clay stabilizer comprises a cationic polyamine having a molecular weight of from about 1,000 g/mol to about 200,000 g/mol.

8. The method of claim 6, wherein the treatment fluid is introduced into at least a portion of the wellbore or subterranean formation having a temperature of 150° F. or higher.

9. A method of fracture stimulation comprising:

introducing an additive comprising a salt, a cationic shale inhibitor, and an anionic shale inhibitor into a treatment fluid, wherein the cationic shale inhibitor is present in the additive at a ratio of about 1:2 to about 1:5 by volume of the anionic shale inhibitor, wherein the cationic shale inhibitor is selected from the group consisting of:

polydiallyldimethylammonium chloride; a cationic polyamine; a quaternary ammonium salt; and any combination thereof;

wherein the anionic shale inhibitor is selected from the group consisting of:

polyacrylamide polymer, copolymer, or terpolymer; polyacrylic acid; polyacrylamide copolymer; a block copolymer of polyacrylamide and 2-acrylamido-2-methylpropane sulfonic acid (AMPS); 2-acrylamido-tertbutyl sulfonic acid (ATBS); poly(acrylamide-co-acrylic acid); and any combination thereof;

wherein the salt is selected from the group consisting of: calcium chloride, sodium chloride, potassium chloride, calcium bromine, ammonium chloride, ammonium nitrate, sodium acetate, and any combination thereof;

wherein the cationic shale inhibitor is present in the additive in an amount of about 2% to about 5% by weight of the additive;

introducing the treatment fluid into a wellbore penetrating at least a portion of a subterranean formation that comprises shale at or above a pressure sufficient to create or enhance one or more fractures in the subterranean formation; and allowing the additive to interact with the shale in the subterranean formation having a temperature of 150° F. or higher to at least partially inhibit the shale.

* * * * *